(12) United States Patent
Kent (10) Patent No.: US 7,470,362 B2
(45) Date of Patent: *Dec. 30, 2008

(54) IN LINE WETLAND WATER TREATMENT SYSTEM AND METHOD

(75) Inventor: Greg B. Kent, Oceanside, CA (US)

(73) Assignee: Modular Wetland Systems, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/929,266

(22) Filed: Oct. 30, 2007

(65) Prior Publication Data

US 2008/0251448 A1    Oct. 16, 2008

Related U.S. Application Data

(63) Continuation-in-part of application No. 11/735,384, filed on Apr. 13, 2007, now Pat. No. 7,425,262.

(51) Int. Cl.
C02F 3/30 (2006.01)
C02F 3/32 (2006.01)

(52) U.S. Cl. .................. 210/150; 210/163; 210/170.03; 210/602

(58) Field of Classification Search ................ 210/602, 210/747, 163–166, 170.03, 150
See application file for complete search history.

(56) References Cited

U.S. PATENT DOCUMENTS

| | | | | |
|---|---|---|---|---|
| 5,437,786 A | * | 8/1995 | Horsley et al. | 210/170.03 |
| 5,549,817 A | * | 8/1996 | Horsley et al. | 210/122 |
| 5,702,593 A | * | 12/1997 | Horsley et al. | 210/122 |
| 5,893,975 A | * | 4/1999 | Eifert | 210/602 |
| 5,951,866 A | | 9/1999 | Grove et al. | |
| 6,467,994 B1 | | 10/2002 | Ankeny et al. | |
| 6,569,321 B2 | * | 5/2003 | Coffman | 210/150 |
| 6,638,424 B2 | | 10/2003 | Stever et al. | |
| 6,652,743 B2 | | 11/2003 | Wallace et al. | |
| 6,905,599 B2 | * | 6/2005 | Allard | 210/602 |
| 2004/0074846 A1 | | 4/2004 | Stever et al. | |
| 2005/0183997 A1 | * | 8/2005 | Happel et al. | 210/163 |
| 2006/0151387 A1 | * | 7/2006 | Yost et al. | 210/605 |

* cited by examiner

*Primary Examiner*—Fred Prince
(74) *Attorney, Agent, or Firm*—Lisel M. Ferguson; Procopio, Cory, Hargreaves & Savitch LLP (57) ABSTRACT

A complete storm water management system and process which incorporates a wetlands water treatment system. This system creates an infrastructure, flow control which is multi-level and multi-stage. This is a modular system which includes three or more chambers and/or ditches through which the storm water or other influent passes and is cleaned. The influent which flows into a storm drain, curb inlet, or inflow pipe into the system is directed first into a screening type catch basin inset filter within the first chamber of the system. The influent is treated within the first chamber before it passes out of this chamber into the incorporated wetlands system. The water flows through the wetlands chamber or ditch where it is further filtered and decontaminated through both an aerobic and anaerobic process. In situations of high runoff there is a bypass component.

4 Claims, 9 Drawing Sheets

IN LINE WETLAND WATER TREATMENT SYSTEM AND METHOD

CROSS-REFERENCE TO RELATED APPLICATIONS

This application is a continuation-in-part application and claims the benefit of U.S. application Ser. No. 11/735,384, filed on Apr. 13, 2007, now U.S. Pat. No. 7,425,262. The above application is hereby incorporated by reference as though set forth in full.

FIELD OF THE INVENTION

The present invention relates, in general, to a water capture/drainage and treatment system and a method of using the same. More particularly, the present invention relates to a modular system which captures, controls flow, and removes pollutants from water and treats stormwater runoff or other grey water. The system combines drainage infrastructure, a wetlands ditch and multi-level treatment in one linear modular unit.

BACKGROUND OF THE INVENTION

Water treatment systems have been in existence for many years. These systems treat stormwater surface run-off or other polluted water. Stormwater surface runoff is of concern for two main reasons: one because of the effects of its volume and flow rate, and two, because of the pollution and contamination it can carry. The volume and flow rate of stormwater is important because high volumes and high flow rates can cause erosion and flooding. Pollution and contamination are important because stormwater is carried into our rivers and streams, from there into our lakes and wetlands, and furthermore because it can eventually reach our oceans. Pollution and contamination that is carried by stormwater can have adverse affects on the health and ecological balance of the environment.

Beginning in 1972 with the passage of the Clean Water Act the federal government through the Environmental Protection Agency has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as stormwater management. Devices and procedure that remove or reduce the pollutants and contaminates and/or control peak flows and volumes are often referred to as best management practices or BMPs. BMPs utilize natural means, artificial or man-made means, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands. These BMPs typically use one or more mechanisms to remove the pollutants and contaminates. These mechanisms include sedimentation, filtration, absorption, adsorption, flocculation, stripping, leaching, bioremediation, and chemical process including oxidation reduction, ion exchange, and precipitation.

Furthermore, stormwater treatment systems can also be classified in relationship to the treatment level in which they are being used. In this respect the term treatment is generally used to describe the unit processes that that are used to reduce the quantities of pollutants and containments in stormwater runoff. For example, basic or pre-treatment typically refers to the removal of gross solids, sediments and larger debris through the processes of settling and screening, while enhanced or advanced treatment typically refers to processes for reducing targeted pollutants; filtration being the main form of enhanced treatment for stormwater. Filtration utilizes a combination of physical, chemical, and biological processes. Types of filtration greatly vary dependent on the media use. Medias can be both inert and/or sorbent and are also strongly linked to natural biological processes that thrive in and/or around the media environment. Advanced filtration techniques especially include chemical and biological processes and generally include, but are not limited to processes that bring stormwater in contact with plants including both macrophytes and microphytes, plants that are both visible and invisible to the naked eye. One type of stormwater treatment system that is especially effective at advanced treatment is known as a wetlands system or often simply referred to as wetlands.

When creating a constructed wetlands, the objective is to minimize the size of the media to maximize the surface area of the media and to also maximize contact time with possible biofilm which can grow on the media, but also to provide media sufficiently large so that the interspacing will not be occluded with the sedimentation that is being carried in the treated water. Accordingly, as a matter of practicality it makes sense to remove as much sediment as possible before allowing the water to enter the wetlands system. In this respect the design of an effective treatment system would contain sufficient screening to remove trash and debris, sufficient sedimentation to remove sediment to a level sufficient to maximize the use of the wetlands. To preserve efficient operation of the system, the system should be operated at an appropriate flow rate that maintains and preserves the life and operation of the system as a whole. The average or mean time that water remains in contact with the wetlands system is termed the hydraulic resident time or HRT of the wetlands.

Given uniform flow through the sediment chamber, the sedimentation HRT is proportional to the volume of the chamber and inversely proportional to the flow rate. The time required for a particle to settle a specific distance is often referred as the settling time for that particle size and density. Because deeper settling chambers require a greater distance for particles to settle, deeper settling chambers have longer respective settling times. And, because the volume of a sediment chamber is also proportional to the depth of the chamber, increasing the depth increases both the volume (and thereby the HRT) and the settling time. Therefore, increasing the depth of the chamber increases the HRT, but may not increase settling efficiencies since the distance to settle increases proportionally with increase in HRT. Accordingly, the overriding principle of achieving effective sedimentation is to provide the maximum surface and floor areas in the chamber as possible. Other considerations are to increase the path length through the sediment chamber to increase the uniformity of the flow and to prevent high flow rate conditions from re-suspending existing sediment (often referred to as scouring).

In a similar manner, the basic separation principles that apply to the settling of particles more dense than water apply to particles that are less dense than water except that the particles float to the surface rather than settle to the bottom of the chamber. Because oils and hydrocarbons are typically less dense than water, because these products can often be separated mechanically by flotation, and because the products can create adverse biological demands on a wetlands system placed downstream of the sedimentation and flotation chamber, it makes sense to allow the floatable products to remain in the chamber and to remove the out-flow water from below the surface.

Because the objective of a sedimentation and flotation chamber is to remove sediment and floatable products from the incoming water, the accumulated sediment and floatable products will require periodic removal. Systems that are configured to allow easy removal of these products will undoubtedly provide reduced maintenance costs.

Flow-rate control is another consideration. Because the performance of some BMPs like sedimentation and flotation chambers and wetlands systems is dependent on hydraulic resident times (HRTs), optimum performance can be obtained by having sufficient control to not allow flow rates to vary excessively beyond certain limits. Devices that can be used to control the flow rate include bypass controls and inlet and outlet control systems.

Because some treatment locations may have high levels of specific pollutants and contaminates, specific configurations using additional BMPs may provide benefits and advantages above typical or standard configurations. Such BMPs may include additional filter systems, additional media chambers, aeration, bioremediation systems, irrigation systems, and mixing manifolds. Any system that can be configured to accommodate additional devices and methods of pollution and contaminate removal is by definition a more versatile BMP. Due to the lack of ground area for treatment systems in urban areas there is also a need for a system which can be placed in parking lots or other cement covered areas.

There is, thus, a need for a wetlands stormwater treatment system which can treat high levels of specific pollutants and contaminants and can be easily placed in urban concrete covered areas.

SUMMARY OF THE INVENTION

This invention involves a process and method for manufacturing and using a complete stormwater management system, which performs both drainage (infrastructure and flow control) and treatment (multi-level and multi-stage) tasks, and incorporates a wetlands water treatment system ("system") which is reliable, dependable, effective, low maintenance and structurally sound. This is a self-contained storm water management system incorporating a wetlands treatment system. It can be placed in parking lots, on the side of a road, on the side of a free way, under a road way or in another area where polluted run-off needs to be captured and treated.

This is a system and method wherein the influent, which includes but is not limited to storm water, run-off water, polluted water or other liquid, is passed through a stormwater grate or curb opening, and/or inflow pipes located on the side of the catch basin. The influent which flows into the stormdrain is directed into a screening type catch basin insert filter, the influent next flows into a preliminary wet basin, then the pretreated influent will pass through the primary filtering devices, this treated influent then enters an enhanced subsurface flow gravel wetland which can be created by a ditch, hole or man made chamber. The influent passes through the wetland where additional pollutants and particulate matter is removed. The treated influent is discharged at a controlled rate from the wetland through an outlet flow control device known as the variable level treatment component (VLT Component). The VLT Component is designed in such a way to offer variable discharge rates and thus variable treatment levels over a range of flows. The system is also designed with an internal component and system bypass, which allows higher flows to bypass the wetlands in situations of high water run-off. The internal bypass eliminates loss of previously captured pollutants and particulate matter. The bypass pipes are configured with perforations to offer component bypass, which will offer isolated component bypass in the case of one component becoming clogged. The system performs the tasks of capturing (drainage infrastructure), treatment (multi-level and multi-stage), controlling flow, and bypassing higher flows (internally), which makes the system inherently a complete stormwater management device. This invention removes trash, litters, debris (organic and non organic) solids, sediment, total suspended solids ("TSS"), metals (dissolved/particulate), nutrients (dissolved/particulate), oils, hydrocarbons, polycyclic aromatic hydrocarbon ("PAH"), and pathogenic bacterium contaminants from the influent.

This system can be placed underground, below concrete, such as parking lots or park areas. The system top can also be placed at grade so as to function as an island to be filled with plants in the middle of a parking lot, its perimeter or other area. The systems shape is specifically designed to be easily used given the space constraints on development sites given the current standards of land use, including landscape requirements and current drainage infrastructure configurations. Segments can be added to the wetlands portion such as digging additional ditches or holes, increasing the length of the ditch or adding man made chamber of this system to increase its length and filtration capacity. These ditches or segments can be added at an 90 degree or less angle from one another thus allowing the wetlands chamber to be configured in various shapes for example an L, S or U shape. The system is designed to work with current parking lot and street designs, including drainage, logistics and landscape. The systems long length and capability to have a narrow width make it ideal for street rite-of-ways, including landscaped and or sidewalk/walkway areas. The system is specifically designed to be used as part of the layout of current parking lot islands. The system's landscaped wetland element adds to the aesthetics and current design of parking lot islands and perimeters. Many cities' regulations require that parking lots which cover large surface areas have an islands and perimeters which incorporate plants or trees. This system is able to meet this need as well as functioning as the water drainage and treatment structure.

This system is self contained in its own housing and has the ability to utilize the natural environment. The system and housing is easy to maintain and construct. The system and system housing can be fabricated, built, and assembled in a broad range of sizes and materials to accommodate and treat a broad range of influent flow rates. The functional components of the system can be selected, sized, tailored, and assembled to provide a range of performance and options from basic configurations to customized configurations which provide levels of performance suited to specific or individual situations which may require various unique solutions to treat stormwater or even other wastewater.

The system is capable of treating large volumes of polluted or contaminated water. Contaminated water or run-off can include urban run-off, agricultural run-off, and urban, agricultural, commercial or industrial wastewater. This system is beneficial and can be used in many locations, some locations are residential subdivisions, commercial developments, retail and industrial sites, roads and highways, reconstructions, habitat restorations, lake shores, marinas and landings, collection pools, parking lots, transportation terminals and maintenance facilities. The system configuration is adaptable to the local conditions permitting its effective use wherever water treatment is needed or desired. This system is designed to be its own drainage collection structure and to connect to existing drainage collection structures. The system can be manufactured in various depths, lengths, and widths. It contains a vegetative submerged bed, which houses the wetlands system, where plants may grow. The vegetative submerged bed can be contained in a ditch, hole or manufactured chamber. The system has a variable discharge rate (1-450 gal/min) allowing it to be used in any type of soil and both landscaped and hardscaped areas. The variable and adjustable discharge rate will also meet possible hydromodification requirements (volume based) and/or be sized as a flow based treatment system. Thus, in these types of situations the unit will not only provide treatment, but also necessary flow control. The system also has an internal bypass component that will bypass higher flows around the different treatment components.

In this system, the influent enters into a catch basin chamber, containing various treatment filters. From the catch basin chamber, influent flows through pipes into the vegetative submerged bed of the wetlands chamber. As influent flows through the root zone of the vegetative submerged bed microbes metabolize petroleum hydrocarbons, nitrogen and other pollutants. The pollutants are attenuated via the process of filtration, absorption, adsorption, bio-accumulation and bio-remediation. Precipitation of metals and phosphorous occurs within the wetland substrate while biochemical reactions, including decomposition, provide treatment of stormwater prior to discharge.

Influent flows into or is piped into the catch basin where the screening device captures larger sediment and gross solids. Screened influent flows to the bottom of the settling chamber where particles fall out to the bottom of this chamber. The catch basin may also contain filtration panels which contain filtration media for additional particulate filtration. The lowest 6 inches of this chamber are below the pipes which flow into the vegetative submerged bed. The influent flows outward through the perimeter filters media walls and in some embodiments through the added filtration panels. The treated influent flows from the settling chamber through water transfer perforated pipes into the vegetative submerged bed. The pipes extend a distance into the vegetative submerged bed and each contains vertical and horizontal slits for the influent to flow uniformly into the media, this set-up allows the influent to be easily distributed over a large surface area. The influent then flows through the filtration media and exits the system through a slotted exit pipe. The exit pipe is formed in an elbow shape allowing each end to extend through the concrete wall and express the treated influent into the discharge chamber. The discharge treatment chamber is covered with fiber glass or steel doors so as to allow easy access to clean out this chamber. The treated influent flows from this discharge chamber through the outflow pipe into the surrounding soils or through a pipe into a secondary storage facility or discharges to the existing drainage discharge infrastructure.

The set-up of this system allows it to process a large volume of storm or grey water. There are outlet control valves on the pipes leading from the wetland chamber to the discharge chamber. This valve can be used to set the desired discharge rate over a range of varying head pressures. It can also be closed to contain pollutants or maintain sufficient influent in the system. The outlet control valve can be a simple ball type valve which can limit the amount of influent which can be discharged from the system. The influent from the control valves flows unrestricted through the outflow pipe. The system can sit either below ground, flush with the ground or at any level above ground. In a system that sits flush with ground level, the filtration media can be planted with various types of plants, trees or shrubs.

The catch basin chamber and the discharge chamber as well as the embodiments which contain a wetlands chamber in underground configurations, rather than a ditch, are equipped with hatches to allow access for cleaning or maintenance of the system. In a system which sits a distance below the ground, three access ports for the catch basin/pre-treatment chamber, wetland chamber and discharge chamber are allowed through either a manhole or a tube extending upward to the ground surface.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DETAILED DESCRIPTION OF PREFERRED EMBODIMENTS

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Figure 1:
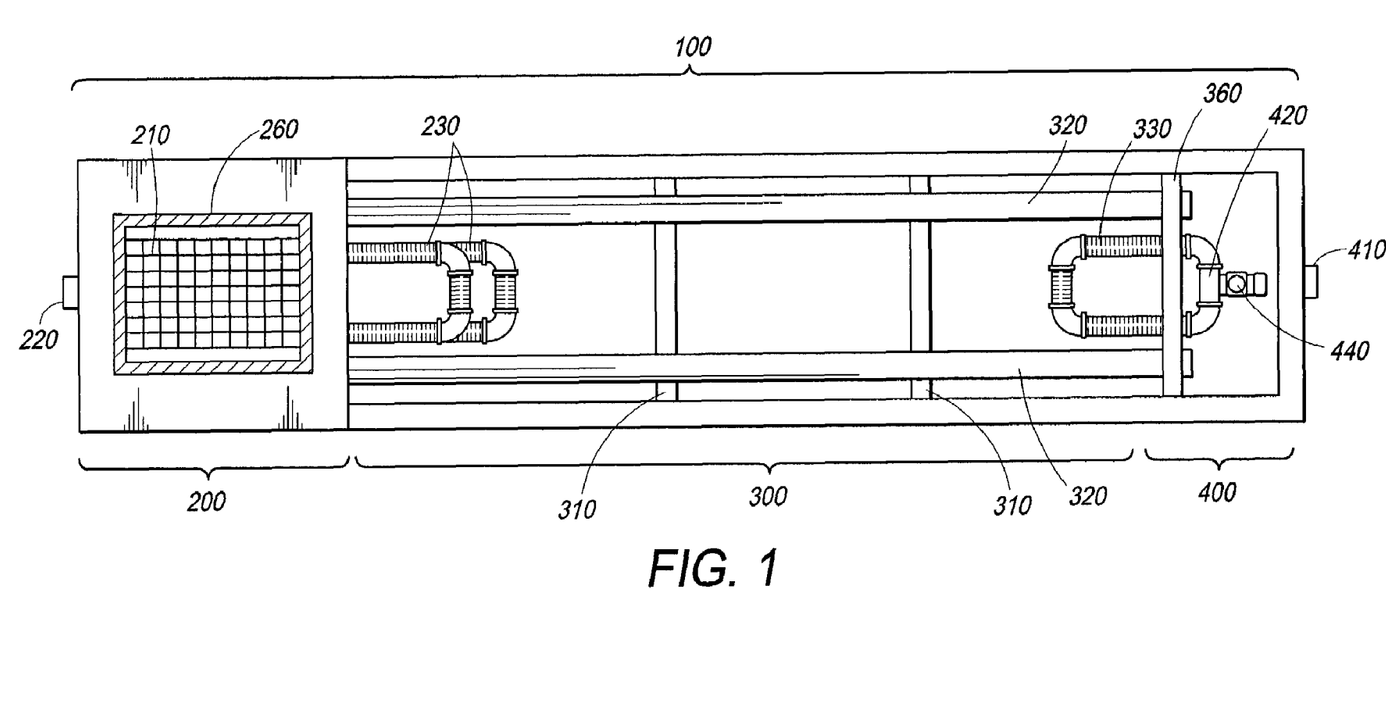
FIG. 1 is a top plan view of an embodiment of an in-line wetlands water treatment system.
Figure 2:
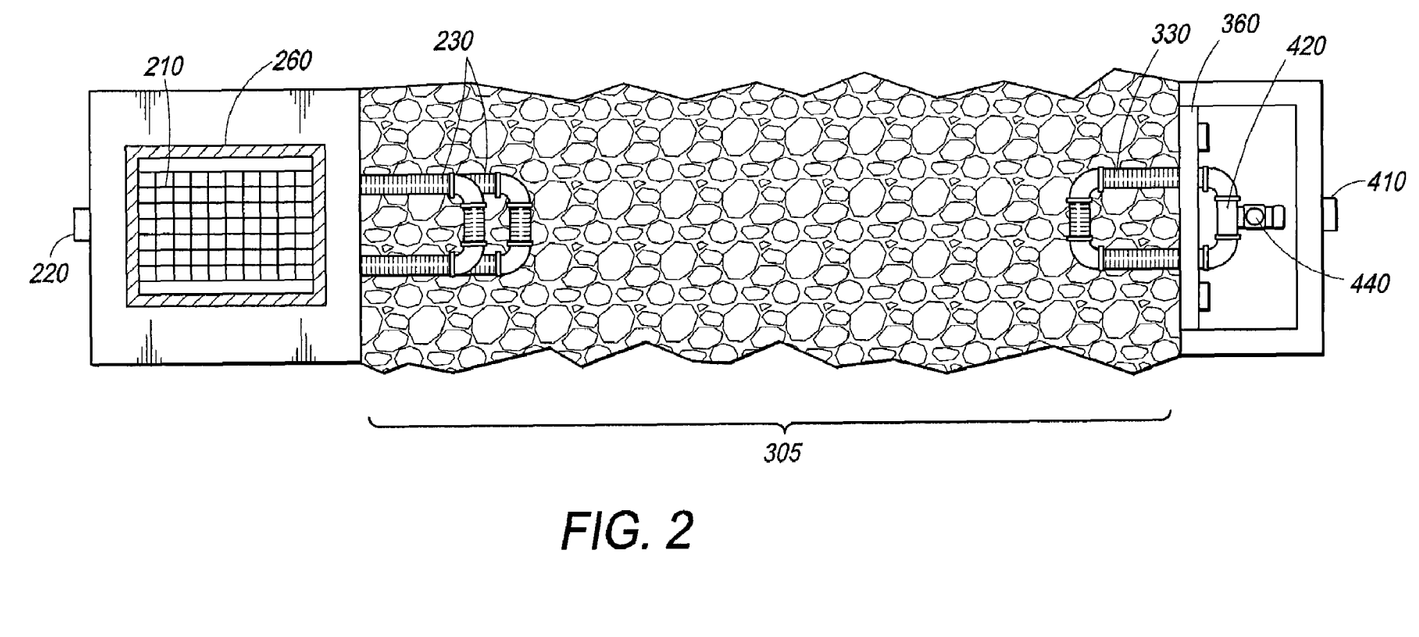
FIG. 2 is a top plan view of an embodiment of an in-line wetlands water treatment system where the wetlands chamber is a ditch.

With reference to FIGS. 1 and 2 two embodiments of an in-line wetland water treatment system ("system") 100 are shown and will be described. This system 100 is composed of three main congruent compartments set-up in a linear fashion, a catch basin/pre-treatment settling chamber ("catch basin") 200, enhanced sub surface flow "SSF" wetlands chamber ("wetlands chamber") 300 or wetlands ditch 305 (FIG. 2), and a discharge chamber 400. In one embodiment, the wetlands chamber 300 (FIG. 1) or ditch 305 (FIG. 2) can be modular so that additional segments or ditches can be added to lengthen this chamber.

Figures 7A, 7B, 7D:
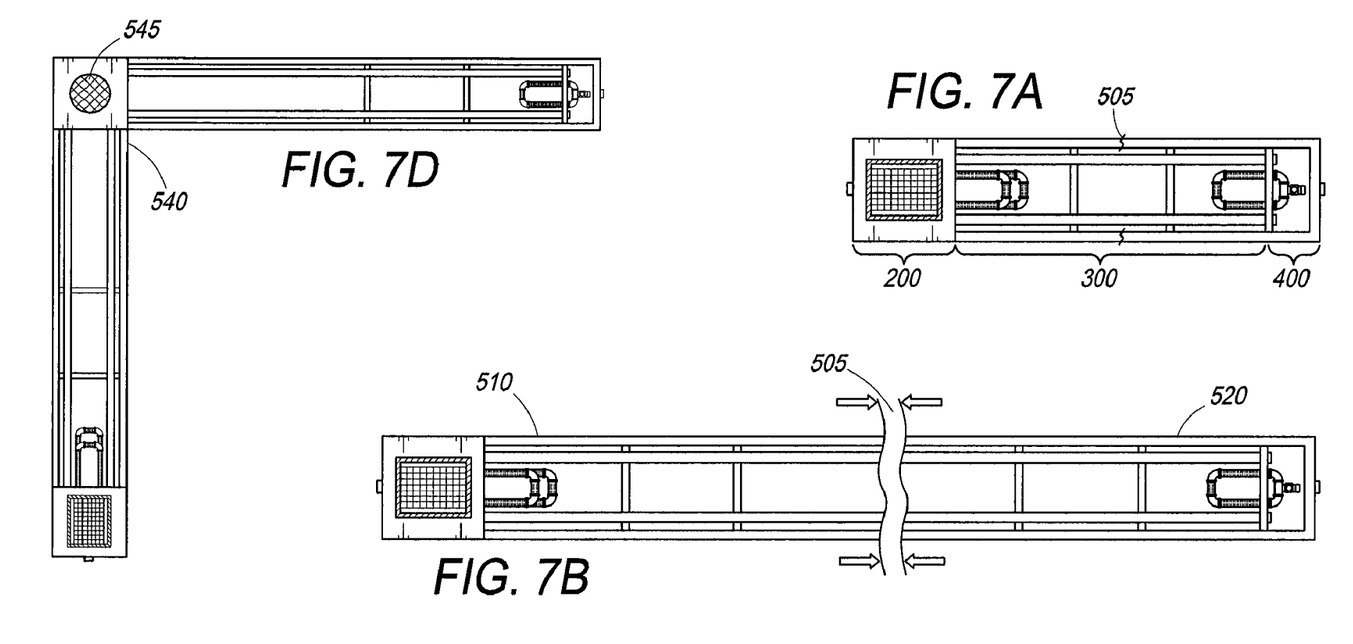
FIG. 7A is a perspective view of the in-line wetlands water treatment system with breaks in the wall and the floor to allow the addition of wetlands segments.
FIG. 7B is a perspective view of the in-line wetlands water treatment system pulled apart to show where additional wetlands segments can be added.
FIG. 7D is a perspective view of the in-line wetlands water treatment system with the addition of a elbow-shaped wetlands segment.
Figure 7C:
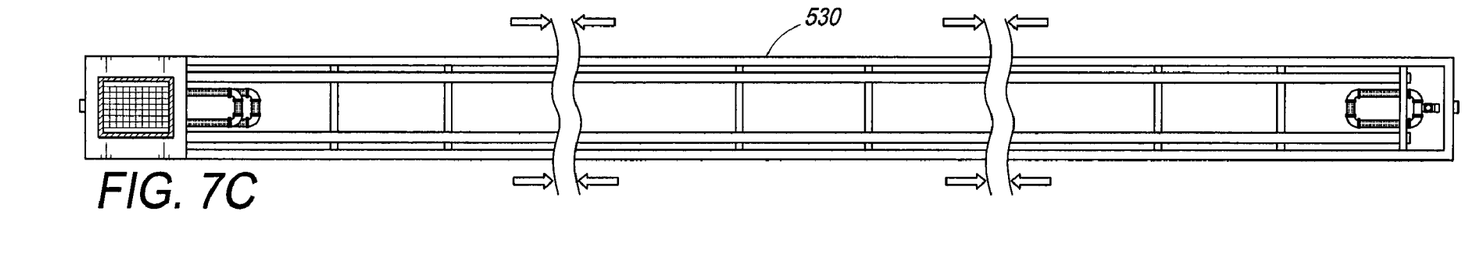
FIG. 7C is a perspective view of the in-line wetlands water treatment system pulled apart with a wetlands segment being added.

In one preferred embodiment the catch basin 200 is covered by a grate 210 or other permeable covering into which the influent, including but not limited to storm water, run-off water, polluted water or other liquid, flows. Influent can also enter the catch basin 200 through one or more inflow pipes 220. The catch basin 200 has walls and a floor. Some embodiments contain an inflow pipe, while others do not. Once the influent enters the system 100 it flows through a series of filters which will be described in detail in FIGS. 2, 3 and 7 and then exits the catch basin 100 through two or more inlet transfer pipes 230. The inlet transfer pipes 230 pass from the catch basin 200 through the separation divider 240 into the wetlands chamber 300 (FIG. 1) or ditch 305 (FIG. 2). The inlet transfer pipes 230 are perforated once they enter the wetlands chamber so that influent can flow out. The inlet transfer pipes 230 extend a distance into the wetlands chamber 300 and make a 90-degree angle to form a "U" shaped pipe within the wetlands chamber 300.

The catch basin 200 is specifically designed with a high flow bypass 320 to direct flow around the treatment components at flows higher than intended for the treatment component(s) or in the case of clogging of one component. The system 100 is equipped with two component bypass pipes 320 in instances when the inflow of the influent coming in is too high. The bypass pipes 320 transfer the influent past the wetlands chamber 300 directly to the discharge chamber 400 once it passes through the first level of filtration. The bypass pipes 320 have sections of perforation 325 (FIG. 3) to allow some influent to flow into the surrounding wetlands filtration media. These perforations allow for individual component bypass.

The wetlands chamber 300 (FIG. 1) or wetlands ditch 305 (FIG. 2) is a treatment chamber containing a vegitative submerged bed 370 which is a combination of rock substrate and various media mixtures, which can be configured with two or more baffles 310 to isolate pollutant movement from the inlet to outflow ends of the wetlands chamber 300 (FIG. 1) or wetlands ditch 305 (FIG. 2). The wetlands chamber 300 (FIG. 1) has walls and a floor. The wetlands ditch 305 (FIG. 2), also referred to as a gravel pit, infiltration pit or bio swale, is a hole or ditch dug in the ground and then filled with filtration media and other components set forth in more detail with reference to FIGS. 3 and 4 to comprise the vegitative submerged bed 370.

Figure 8:
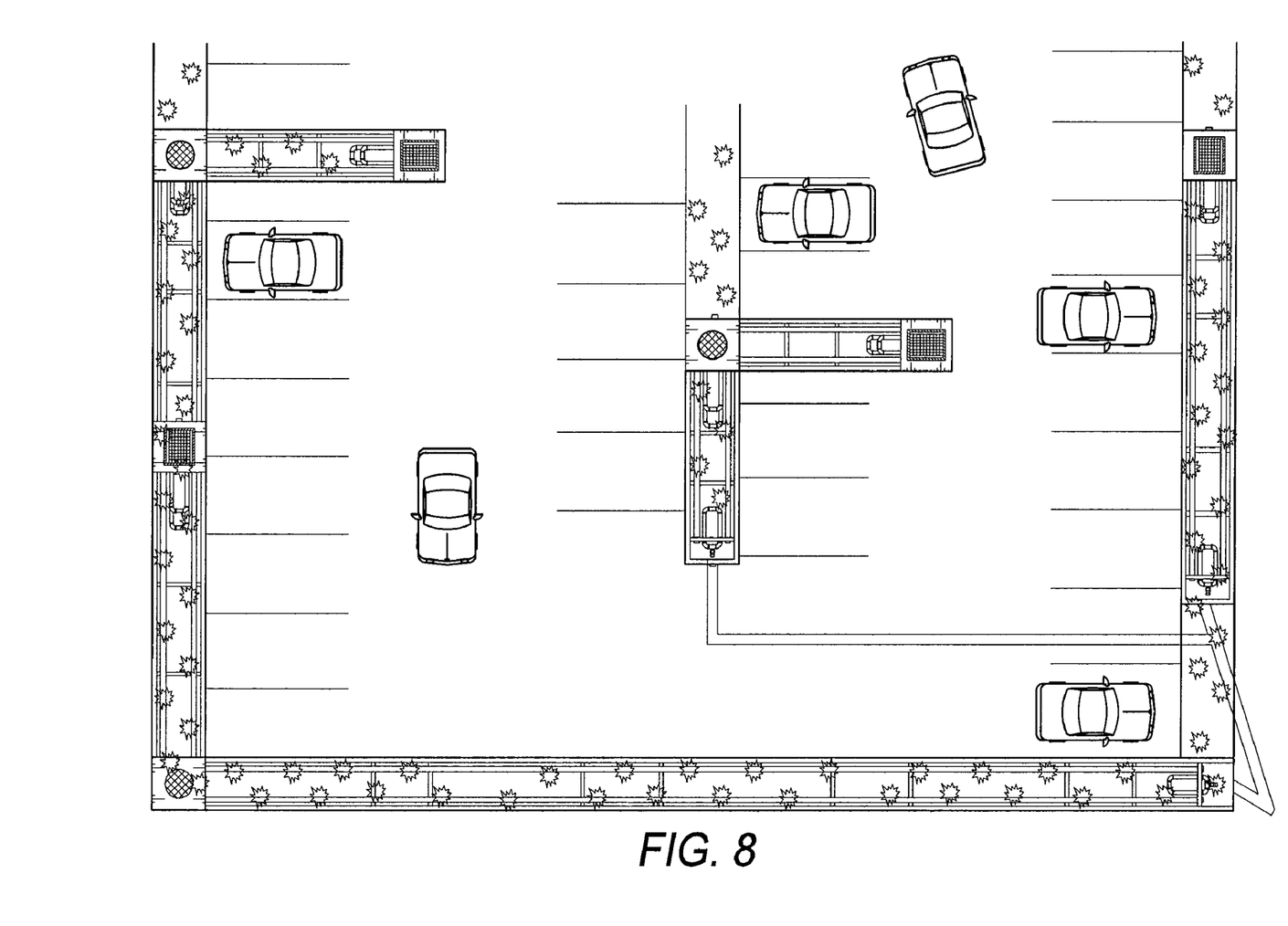
FIG. 8 is a perspective view of the in-line wetlands water treatment system placed in the ground with the addition of wetlands segments to allow it to be configured in various shapes.

In one embodiment additional segments can be added to the wetlands chamber 300. The walls of the chamber contain a break 505 (FIG. 7A,B) where they fit together and are latched or clamped for connection to one another. A new wetlands chamber segment 530 (FIG. 7C) or multiple segments can be added to increase the length of the system. The segments can also be manufactured to form a corner or elbow FIG. 7D. When a segment is formed in a corner or elbow configuration a transfer chamber 540 (FIG. 7D) is added at the joint. In the case of a wetlands ditch 305 (FIG. 2) additional ditches can be dug and the discharge chamber 400 can be moved to the end to the new ditch segments. In the case of wetlands ditches 305 (FIG. 2) a transfer chamber 540 (FIG. 7D) can be added between the interconnected ditches. The transfer chamber 540 allows water to pass between the two portions of the wetland segment or ditches. The transfer chamber 540 may also be covered by a man hole or other access part to allow entry into the transfer chamber 540. A corner or elbow segment allows the system to be formed into a L, U, or S shape FIG. 8. By adding wetlands segments or ditches to the system the wetlands chamber 300 (FIG. 1) or wetlands ditch 305 (FIG. 2), size, length, the HRT, and flow path are increased, thus increasing pollutant removal efficiencies and system treatment capacity. The segments can be built or the ditches can be dug at a fraction of the cost of the entire system, and, as a result, an increased performance can be offered for minimal cost. In the case of a wetlands chamber 300 the wetlands segments 530 lock together with various joint configurations making assembly time efficient and easy.

The wetlands chamber 300 (FIG. 1) or wetlands ditch 305 (FIG. 2) is designed with both aerobic and anaerobic zones to enhance removal of different pollutants of concern. The wetlands chamber 300 (FIG. 1) or ditch 305 (FIG. 2) incorporates various levels of stonewool media slabs 350 (FIGS. 3 and 4) that create propagation zones for plants. The physical characteristics of the stonewool media 350 will help maintain higher moisture levels throughout the height of the wetlands chamber 300 (FIG. 1) or wetlands ditch 305 (FIG. 2). Higher moisture levels will help maintain the living biofilm throughout the wetlands chamber 300 (FIG. 1) or wetlands ditch 305 (FIG. 2). The media will also create an environment that will allow prediatorial bacteria to flourish, thus raising the ability of the wetlands chamber 300 (FIG. 1) or wetlands ditch 305 (FIG. 2) to treat specific pollutants. The media will also be configured in such a way to provide restrictions on the vertical flow of passing influent. This will help provide further filtration and protection of captured pollutants during higher flow conditions.

Figure 3:
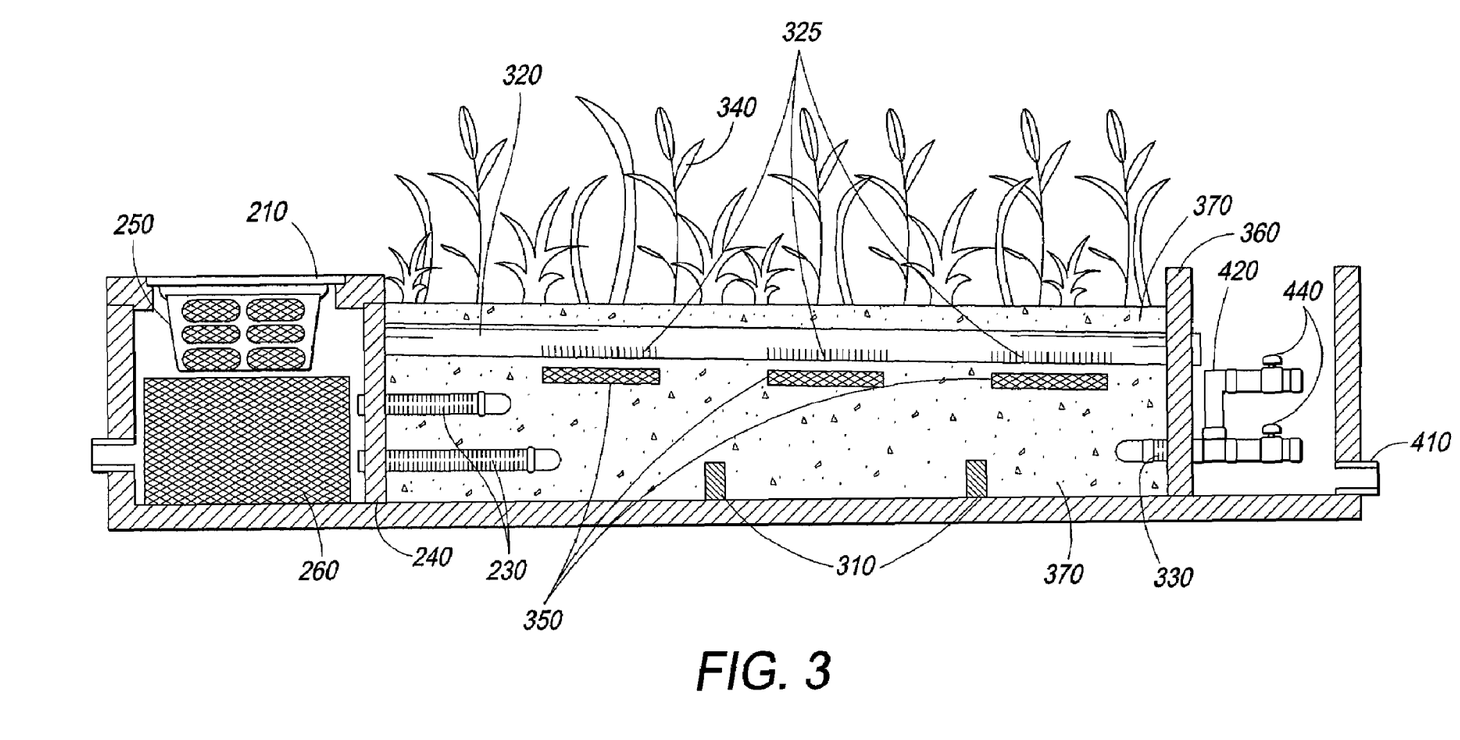
FIG. 3 is a front elevational view of an embodiment of an in-line wetlands water treatment system.
Figure 4:
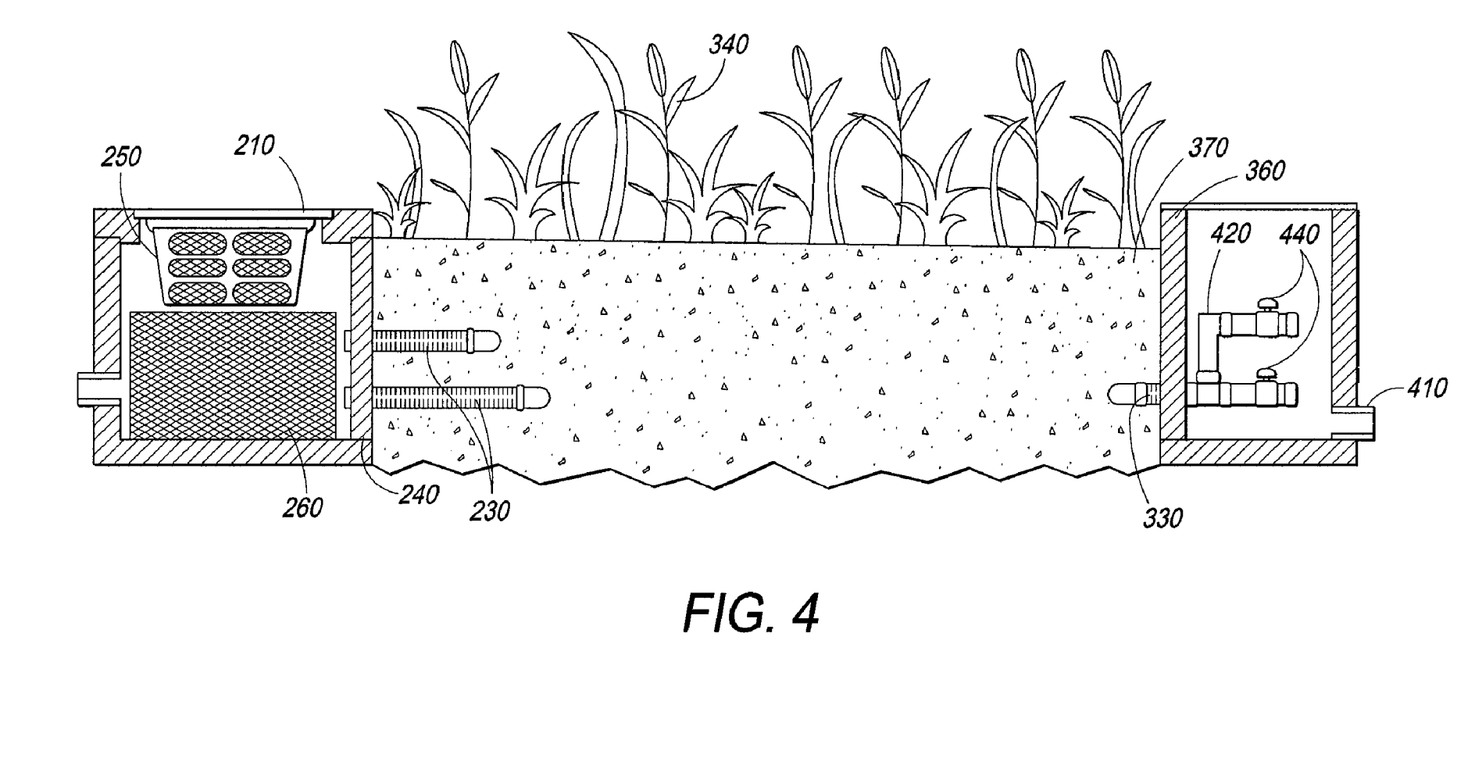
FIG. 4 is a front elevational view of an embodiment of an in-line wetlands water treatment system where the wetlands chamber is a ditch.
Figure 5:
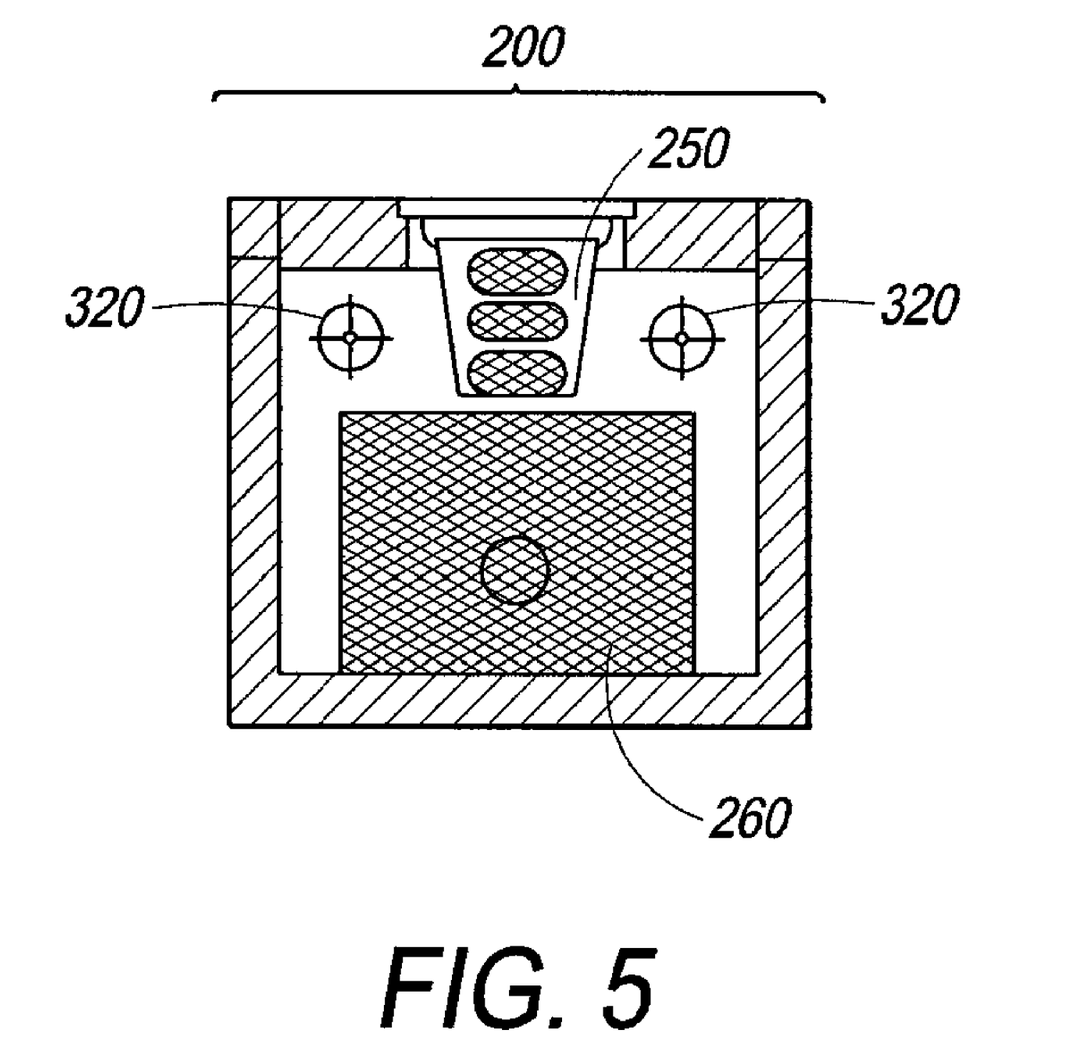
FIG. 5 is a left side elevational view of the catch basin/pre-treatment chamber of the in-line wetlands water treatment system shown in FIG. 1.

Once influent enters the wetlands chamber 300 (FIG. 3) or wetlands ditch 305 (FIG. 4) through the inlet transfer pipes 230 it travels horizontally through the wetlands chamber 300 (FIG. 3), wetlands ditch 305 (FIG. 4), which contains gravel or other filtration media which makes up the vegitative submerged bed 370 (FIGS. 3 and 4). This media creates an aerobic and an anaerobic treatment zone within the rock and various media that is suitable to different types of bacteria (including predatorial and protozoons). These organisms play a critical role in the capture, destruction, and transfer of various pollutants of concern. Influent flows through the wetlands chamber 300 (FIG. 1) or wetlands ditch 305 (FIG. 2) and exits through the exit influent transfer perforated pipes 330 at the distal end. The influent flows into the discharge chamber 400. From the discharge chamber 400, the influent exits the system through the outflow pipe 410.

FIGS. 3 and 4 are a cross-sectional perspective view of two embodiments of the in-line wetlands water treatment system. The influent that passes through the grate 210 flows first into a catch basin insert filter 250. The catch basin insert filter's 250 function is to provide pre-treatment of incoming polluted stormwater. The filters within the insert filter 250 act as an screening and absorbing device targeting gross solids, sediments, letter, trash and other debris (organic and non-organic). The sediments, TSS and associated pollutants settle out of the rising influent column to the floor of the catch basin 200. The system's 100 proportions are designed to allow sufficient surface area in the catch basin 200 to enhance settling of TSS typically found in stormwater runoff. The sedimentation component of the system 100 is followed by the primary filtration component of the described device. In one embodiment primary filtration is accomplished through a catch basin perimeter filter 260. In an alternative embodiment primary filtration is accomplished through added filtration panels 700 (FIG. 9A), or alternatively through both the perimeter filter 260 and filtration panels 700 (FIG. 9B). This perimeter filter 260 is constructed of a metal mesh cage or plastic porous panels that are mounted to the floor or the walls of the concrete catch basin 200. The metal mesh cage or plastic panels have four walls and in some instances a floor, each of the walls and the floor have an inner and outer metal mesh wall or plastic porous panel or shield; the outer wall is configured around the inner perimeter of the catch basins internal walls. The distance between the catch basin 200 walls and outer metal mesh or plastic panel wall of the perimeter filter 260 ranges from a few centimeters to several feet. The inner and outer metal mesh or plastic porous panel walls act as housing for filter media, which is contained between the two walls. The distance between the inner and outer metal mesh walls can vary between 2 cm and several feet in order to house media of varying thicknesses.

FIG. 4 is a cross-sectional view of the catch basin/pretreatment chamber 200 of the system 100. FIG. 4 shows a side view of the insert filter 250 and the perimeter filter 260. The holes for the bypass pipes 320 are shown at the upper half of the catch basin.

Referring to FIGS. 3 and 4 the perimeter filter 260 is designed specifically to house stonewool filtration media slabs and/or other media. The slabs will be inserted between the inner and outer metal mesh or porous plastic walls of the perimeter filter. The perimeter filter 260 can vary in height between a few inches to 10 feet. The perimeter filters 260 is designed and configured to maximize filter surface area within the constraints of the structure it is housed, both in perimeter and height. This catch basin perimeter filter 260 forms a pervious barrier/chamber between the inner and outer areas of the catch basin 200. The design of the perimeter filter 260 is to maximize internal metal mesh or porous plastic wall and thus media surface area, while minimizing distance between the inner wall of the catch basin 200 and outer metal mesh or porous plastic wall of the perimeter filter without inhibiting flow and/or access to the catch basin 200 outer chamber with standard cleaning/VAC equipment.

The influent entering the system 100 and then treated by the catch basin insert filter 250 will next enter the inner chamber of the catch basin 200. The influent in this chamber will flow through the perimeter filter 260 and its housed media 260 to the wetlands chamber 300. Through the process and related device of passing influent through the media, various pollutants are captured and thus removed from the flow stream. The stonewool media has specific physical and chemical properties that allow for high flow rates through its structure and also high level of removal efficiencies for various pollutants including but not limited to: TSS, phosphorous (particulate and dissolved), nitrogen (various forms and states), heavy metals, dissolved metals, and pathogenic bacterium.

Referring to FIGS. 3 and 4, as the influent level rises in the catch basin 200, head pressure builds and thus increases the flow rate through the perimeter filter 260. Influent filtered by the prior components will then enter the enhanced SSF wetland chamber 300 (FIG. 1) of enhanced SSF wetlands ditch 305 (FIG. 2) of the treatment system 100. The wetlands chamber 300 (FIG. 1) or wetlands ditch 305 (FIG. 2) houses the vegetative submerged bed 370. The prior treatment components provide protection from overloading and potential clogging of the wetlands chamber 300 (FIG. 1) or wetlands ditch 305 (FIG. 2). The wetlands chamber 300 (FIG. 1) or wetlands ditch 305 (FIG. 2) contains rock or other filtration media. The rock and other various media substrate within the chamber play a critical role in the physical, chemical, and biological treatment of inflowing influent. The media, both inert and absorptive, not only treat the influent, but also creates an environment that allows for the growth and accumulation of bio film and various predatorial bacteria.

Additionally, the treatment in the wetlands chamber 300 (FIG. 1) or wetlands ditch 305 (FIG. 2) is enhanced by vegetation 340, which can be planted throughout the surface of the wetlands chamber 300. As the vegetation 340 propagates and grows, the root zone establishes throughout the width, length and depth of the wetlands chamber 300 (FIG. 1) or wetlands ditch 305 (FIG. 2). The root zones help the following: transfer oxygen from the surface, create an ecological environment that enhances pollutant removal, and cause plant uptake, which has its own independent treatment benefits.

In the wetlands chamber 300 (FIG. 1) or wetlands ditch 305 (FIG. 2), sedimentation will continue to occur. Relatively larger particles will become trapped within the void space between the filtration media particles. Smaller particles and dissolved pollutants will be captured, transformed, consumed by the following biological and chemical processes. Biological nitrification and denitrification will occur in the vegetative submerged bed 370, as may natural unassisted precipitation of dissolved pollutants on media, in particular phosphorus and metals. Vegetation 340 will develop on the filtration media surface. The vegetation 340 is sustained by dissolved organic compounds in the influent and contributes to biological intake, absorption, and trapping of pollutants. The vegetation 340 enhances removal of fine sediments, metals, nutrients, bacteria and viruses. The vegetation 340 also increases the rate of bioaccumulation of pollutants within the vegetative submerged bed 370. Dependent on the specific characteristics of the filtration media and the amount of plant/root matter within the bed, the processes of ion exchange, adsorption, and absorption will occur. Dependent on the type and ratios of filtration media used, variations in the amount and effectiveness of the above processes will vary.

The wetland component is further enhanced by the incorporation of stonewool media slabs 350. The media slabs 350 have multiple purposes: first, to help propagate the plants and to create zones throughout the depth of the chamber, second, to provide enhanced ecological zones for bacteria communities, water supply zones for plants, root establishment, and bioaccumulation zones that will capture pathnogenic bacteria, and, lastly, to allow for enhanced filtration for influent which exits the perforation sections 325 in the by-pass pipes 320. The media slabs 350 can be placed anywhere in the vegetative submerged bed, at any depth or any angle. Among other pollutants, the wetlands chamber 300 (FIG. 1) or wetlands ditch 305 (FIG. 2) of the system 100 increases the ability to remove nitrogen with the addition of an anaerobic environment in the lower half of the wetlands chamber 300 (FIG. 1) or wetlands ditch 305 (FIG. 2) which promotes denitrification.

Influent flow and discharge rate through the system 100 is controlled by the variable flow rate discharge (VFRD) component 420. This component is located in the discharge chamber 400 of the system. The wetlands chamber 300 (FIG. 1) or wetlands ditch 305 (FIG. 2) and discharge chamber 400 are separated by a baffle 360. Influent treated from the wetlands chamber (FIG. 1) or wetlands ditch 305 (FIG. 2) enters through perforations in a series of exit influent transfer pipes 330 which pass through the baffle 360 into the variable flow rate discharge riser ("VFRD") 420. The VFRD 420 is constructed of piping with multiple outlets and varying heights. Each of the multiple outlets is controlled by a flow control valve and/or flow control orifice 440.

The VFRD 420 along with the systems component isolated bypass pipes 230 allows this system to offer variable level treatment (VLT). The influent then exits the system 100 through the outflow pipe 410. By offering variable levels of treatment the system 100 has the ability to treat different intensity storm events, first flushes, and designated treatment flows at variable levels. By offering variable levels of treatment the system 100 is designed to properly treat specific pollutants of concern during the critical flow ranges of that specific pollutant. This design allows for treatment that maximizes not only efficiency but also feasibility. The systems component isolated bypass pipes 230 offers protection of system effectiveness if one component should clog or fail. By having components connected both in series and in parallel, the components can operate in both in series and independently.

Figure 6:
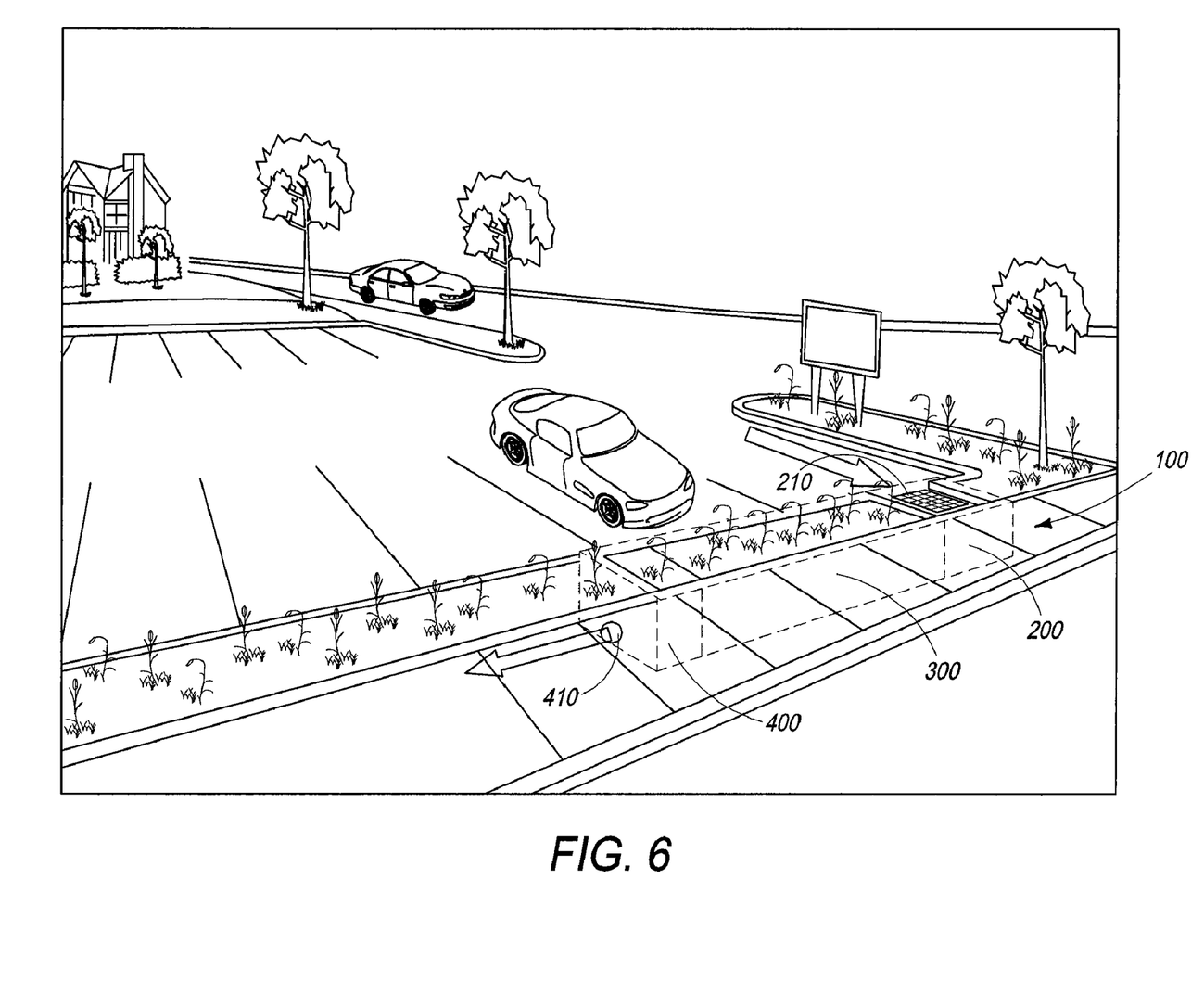
FIG. 6 is a perspective view of an exemplary environment for the in-line wetlands water treatment system of FIG. 1 and shows the in-line wetlands water treatment system placed in the ground.

FIG. 6 is a perspective view of an exemplary environment for the system 100 and shows the system 100 placed in the ground. This system 100 has been placed in a parking lot and the vegetation 340 has been planted on the surface. The influent would flow into the system 100 through the grate 210. After the water passes through the catch basin 200, the wetlands chamber 300 and the discharge chamber 400, it exits the system 100 through the outflow pipe 410.

Figure 9A:
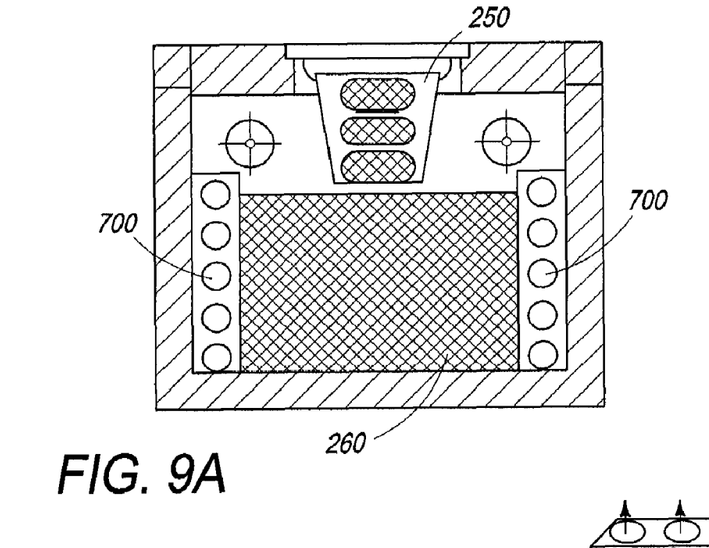
FIG. 9A is side view of the catch basin of the in-line wetlands water treatment system showing two filtration panels inserted.
Figure 9B:
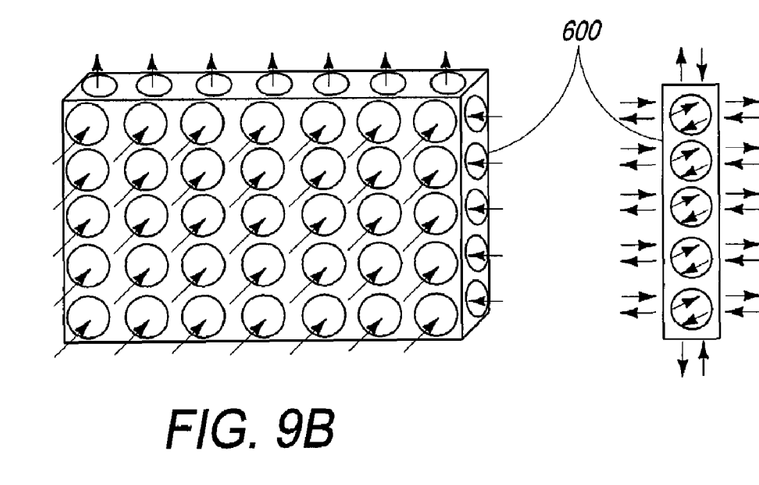
FIG. 9B is a filtration panel which can be used in the wetlands water treatment system or other water treatment systems.

Referring to FIGS. 9A and B filtration panels 700 are shown and displayed. A filtration panel 700 is composed of a parallel and perpendicular 360 degree (vertical and horizontal) flow matrix structure with maximized openings which allow water to freely flow through the panel in all directions. All walls of the filtration panel 700 are permeable to water allowing it to flow through. The matrix structure maximizes void space on all six sides while maintaining a high level of void space, greater that 50%. The filtration panel 700 houses filtration media which in a preferred embodiment has a thickness of 2 cm to several meters and is composed of fibers obtained from a melt of composition of about 80 to 90% diabase material and about 10 to 20% lime. The fibers of the media are very small with at least a majority having a diameter less than 15 microns. The filtration media is permeable to water allowing it to freely flow through the filtration panel 700. The filtration panel 700 which houses the filtration media can accept and discharge water from all directions. The filtration panel 700B can be mounted on the walls and/or floor of the catch basin 200 and/or it can be free standing within the catch basin. The filtration panel 700 provides structural support and protection for the media from incoming flows and helps to distribute flow over the entire surface of the filter. One or more filtration panels 700 can be added to the catch basin and can be easily removed and replaced.

The system 100 can be fitted with many optional components in various embodiments. Some of the optional components of the system 100 can be fitted with one or more of: a trash filter system, an up-flow sedimentation filter, an aeration system, a biomediation system with metering system, a media packaging system, a separate oil (floatable liquids) removable system, an adjustable flow curve outlook control valve, and/or a single or multi-staged advanced treatment filtration modules.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

The invention claimed is:

1. A modular water treatment system, comprising:
   a catch basin for receiving an influent, the catch basin having two or more filters, one or more walls, a floor, one or more bypass pipes and two or more perforated inlet water transfer pipes;
   a wetlands ditch having a vegetative submerged bed with both aerobic and anaerobic zones and various levels of media to enhance removal of different pollutants, and two or more outlet water transfer pipes, the wetlands ditch configured to receive influent from the catch basin through the two or more inlet water transfer pipes and further filter the influent from the catch basin; and
   a discharge chamber having a variable level treatment component, one or more walls, a variable flow rate discharge component controlled by a flow control valve, a floor, one or more outflow pipes, the discharge chamber configured to receive the filtered influent from the wetlands ditch, or water from the one or more bypass pipes, and discharge the influent from the system through the one or more outflow pipes.

2. The system of claim 1, wherein the wetlands ditch on a side of at least one of a road way and a freeway.

3. The system of claim 1, further including two or more bypass pipes which transfer influent directly from an upper half of the catch basin to the discharge chamber, bypassing the wetlands ditch.

4. A method for treating storm water runoff or other polluted water using the system of claim 1, comprising:
   receiving the influent into the catch basin of the system through at least one of a grate inlet, curb opening, and inlet pipe;
   filtering the influent in the catch basin through a series of filters within the catch basin;
   transferring the filtered influent from the catch basin through the one or more inlet water transfer pipes into the wetlands ditch or in through a bypass pipe when the flow is high;
   filtering the influent through the vegetative submerged bed containing filtration media, of the wetlands ditch;
   transferring the filtered influent from the wetlands ditch through the two or more perforated outlet water transfer pipes into the discharge chamber; and
   exuding the filtered influent from the discharge chamber through the two or more perforated outflow pipes.

* * * * *